UNITED STATES PATENT OFFICE.

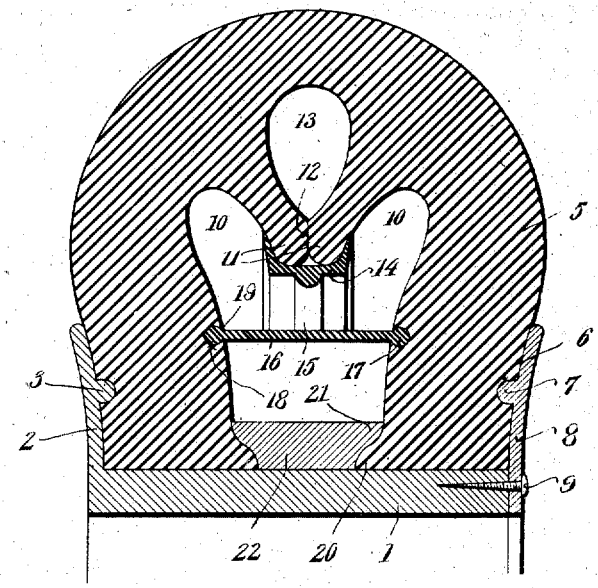
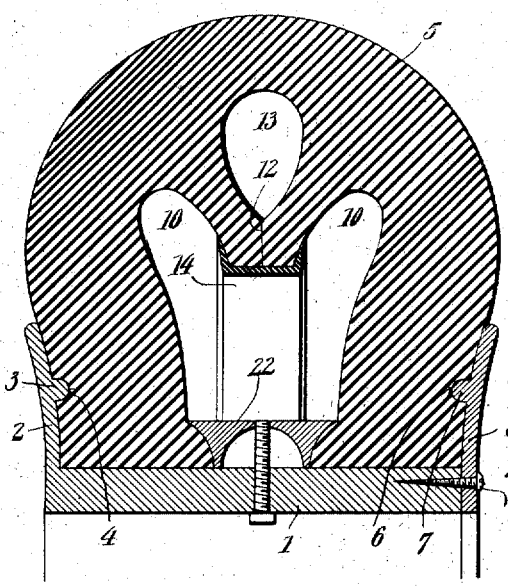
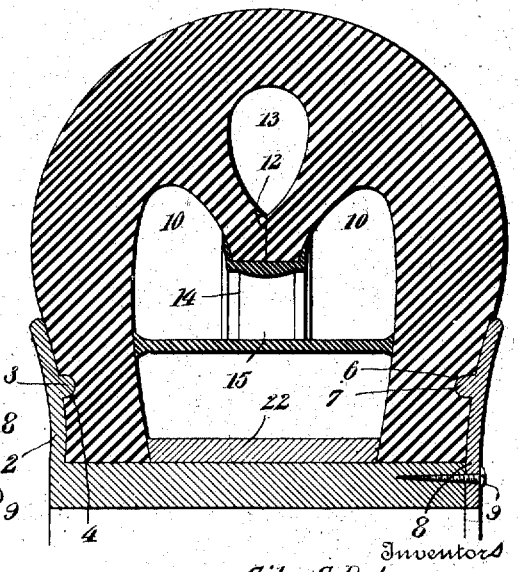

GILES S. DOTY AND JOHN D. SHOW, OF PHILADELPHIA, PENNSYLVANIA, ASSIGNORS TO D. & S. AIRLESS TIRE COMPANY, A CORPORATION OF DELAWARE.

ELASTIC TIRE.

1,002,046.  Specification of Letters Patent.  Patented Aug. 29, 1911.

Application filed January 10, 1911. Serial No. 601,889.

*To all whom it may concern:*

Be it known that we, GILES S. DOTY and JOHN D. SHOW, citizens of the United States, residing at Philadelphia, in the county of Philadelphia and State of Pennsylvania, have invented new and useful Improvements in Elastic Tires, of which the following is a specification.

This invention relates to tires and more particularly to elastic tires.

The object of the invention is the provision of a tire of this character which will have a resiliency equal to the present form of pneumatic tire and which will not be affected by puncture.

A further object of the invention is the provision of a tire of this character formed in the manner of outer casings for pneumatic tires and having inwardly projecting ribs adapted to be separated upon depression of the tire, together with resilient means for holding the projections together.

A still further object of the invention is the provision of a cushion tire adapted to be separated upon depression of the tire, and to be readily connected and removed from the wheel rim and having means adapted to resist and absorb heavy shocks.

Further objects of the invention will appear as the following specific description is read in connection with the accompanying drawing, which forms a part of this application, and in which:—

Figure 1 is a transverse section through the tire. Fig. 2 is a similar view showing a modified form. Fig. 3 is a similar view showing a further modification.

Referring more particularly to the drawing, 1 represents the rim or tire of the wheel which has secured to and projecting from one side thereof a flange 2 having an embossed rib 3 thereon. This rib is adapted to engage an annular groove 4 formed in the cushion tire 5. The tire 5 is substantially horseshoe-shaped in cross section and the opposite leg from that having the groove 4 is provided with a groove 6 which is engaged by a rib 7 formed on a rocking ring 8. This locking ring is adapted to be secured to the tire or rim 1 in any suitable manner, as by bolts 9, as shown. The separated legs of the tire form an annular concavity 10 into which project from the upper inner surface of the tire the separated annular ribs 11. These ribs converge and engage one another, as shown at 12, and form an annular chamber 13 which is normally closed from communication with the cavity 10 when the tire is in normal position.

Connecting the inner edges of the ribs 11 together is an elastic webbing 14 which is connected to the outer side of the ribs by vulcanizing, or in any other suitable manner, and is provided, in the center, with a longitudinal rib 15 which is bridged between the ribs. This reinforcing rib is adapted to widen out when stretched as will be hereinafter described so as to absorb heavy shocks and properly reinforce the webbing.

Extending across the cavity 10 and connecting the separated legs is an elastic webbing 16 having its outer edges provided with a circular reinforcing rib 17 adapted to be secured in a pocket 18 having a restricted mouth 19. This webbing is connected in position across the cavity 10 by bending the lower ends of the legs outwardly until the mouth 19 is sufficiently enlarged to permit the passage of the ribs 17. The webbing 14 and the webbing 16 are continuous annular members, as are the ribs 15 and 17 formed thereon.

When the tire is depressed under the weight of the vehicle the ribs 11 will be projected toward the rim 1 and separated against the tendency of the webbing 14 to hold the same together and when excessive shocks are communicated to the tire the ribs 11 will extend inwardly far enough to engage the webbing 16 which will prevent the tire from collapsing and will absorb the shock instead of having it transmitted through the wheels to the vehicle.

In order to prevent the legs of the tire from coming together the inner portion of the legs are provided with inwardly extending annular ribs 20 which are engaged by flanges 21 formed on the ring 22 which surrounds and is removably mounted upon the rim 1. This ring may be held in place in any suitable manner but it is believed that in practice it will be found unnecessary to connect the ring to the rim, the engagement on each side by the tire being sufficient to hold it from lateral displacement.

Having thus described the invention, what is claimed as new is:—

1. A tire comprising a hollow annular member, independent semi-rigid projections extending into the tire, and a reinforced resilient band connecting said projections and adapted to expand upon separation of the projections when the tire is depressed.

2. A cushion tire comprising a body substantially horseshoe-shaped in cross section, said body having annular pockets formed on the inner sides of the legs thereof, an expansible member having reinforced edges to removably engage said pockets, projections extending into the cavity formed and adapted to engage the expansible member when the tire is depressed, and elastic means for connecting said projections.

In testimony whereof we affix our signatures in presence of two witnesses.

GILES S. DOTY.
JOHN D. SHOW.

Witnesses:
  Jos. A. Coxe,
  K. Allen.